United States Patent [19]

Yamamoto et al.

[11] 4,292,476
[45] Sep. 29, 1981

[54] SPEECH CHANNEL SWITCHING NETWORKS SUITABLE FOR USE IN COMBINATION WITH ELECTRONIC KEY TELEPHONE SETS

[75] Inventors: Kazuyuki Yamamoto; Seiei Ohkoshi, both of Yokohama, Japan

[73] Assignee: Nippon Telegraph and Telephone Public Corporation, Tokyo, Japan

[21] Appl. No.: 83,897

[22] Filed: Oct. 11, 1979

[30] Foreign Application Priority Data

Oct. 18, 1978 [JP]  Japan .................................. 53-127399

[51] Int. Cl.$^3$ .............................................. H04Q 3/52
[52] U.S. Cl. ............................ 179/99 R; 179/18 GF; 340/166 R
[58] Field of Search ........... 179/99 R, 99 LC, 18 FA, 179/18 GE, 18 GF; 340/166 R, 166 EL

[56] References Cited

U.S. PATENT DOCUMENTS

| | | | |
|---|---|---|---|
| 3,504,131 | 3/1970 | Slana et al. ..................... | 179/18 GF |
| 3,647,980 | 3/1972 | Fabiano, Jr. et al. ............ | 179/99 R |
| 3,875,563 | 4/1975 | Hosokawa ....................... | 340/166 R |
| 4,060,699 | 11/1977 | Araka et al. .................... | 179/18 GF |
| 4,107,472 | 8/1978 | Kawanami et al. ............. | 179/18 GF |
| 4,107,474 | 8/1978 | Schneider ....................... | 340/166 R |
| 4,110,566 | 8/1978 | Shanley .......................... | 179/18 GF |
| 4,113,989 | 9/1978 | Schneider ....................... | 179/18 GF |
| 4,151,374 | 4/1979 | Fukuhara et al. ............... | 179/18 GF |
| 4,236,049 | 11/1980 | Tanihata et al. ................ | 179/18 GF |

OTHER PUBLICATIONS

"Development of the Pushbutton Telephone Set", *Electrical Communication Laboratories Technical Journal*, vol. 17, No. 11, pp. 2539-2555, 1978.

Primary Examiner—Gerald L. Brigance
Attorney, Agent, or Firm—Townsend and Townsend

[57] ABSTRACT

In a key telephone system including an electronic speech channel switching network and an electronic key telephone set selectively connected to central office lines by the speech channel switching network, the speech channel switching network is constituted by a pair of incoming lines connected to a pair of central office lines and a plurality of pairs of outgoing lines connected to the key telephone set. The incoming and outgoing lines are arranged in a matrix, and a plurality of controllable unidirectional switching elements are disposed respectively at four cross-points between the incoming and outgoing lines. Each switching element is connected oppositely with respect to one incoming line and to one outgoing line which comprise a pair.

3 Claims, 7 Drawing Figures

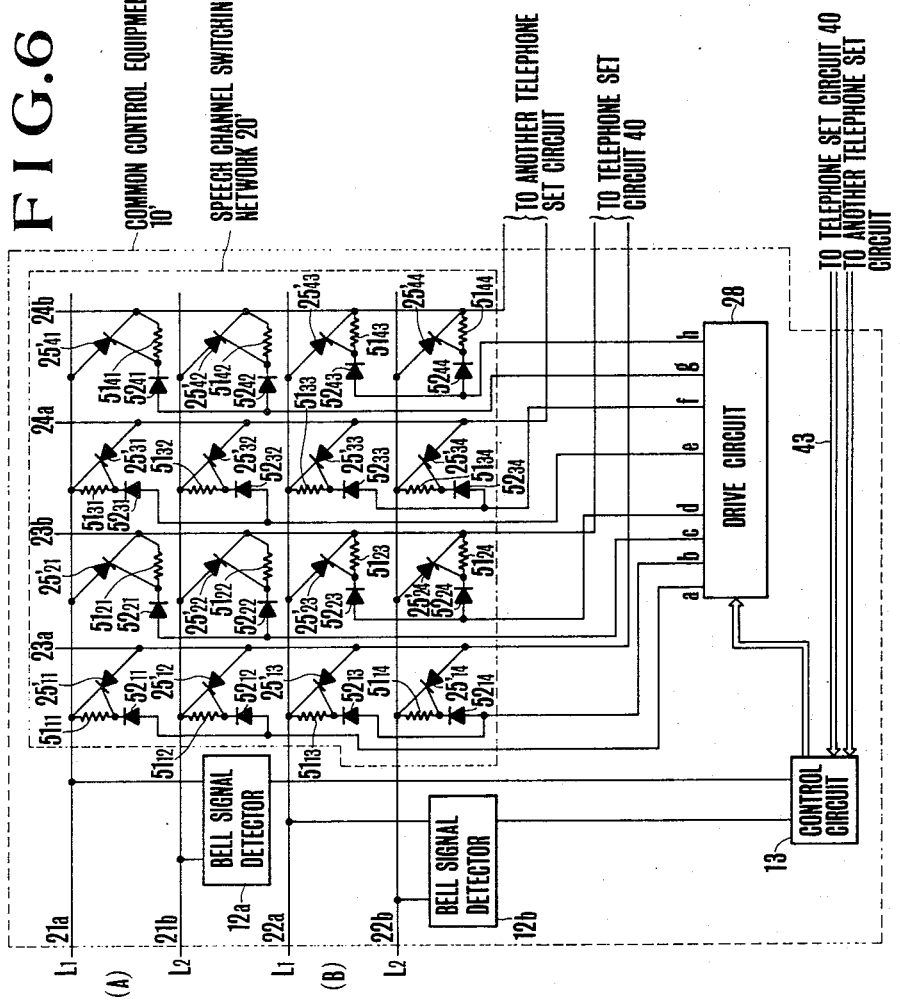

SPEECH CHANNEL SWITCHING NETWORKS SUITABLE FOR USE IN COMBINATION WITH ELECTRONIC KEY TELEPHONE SETS

BACKGROUND OF THE INVENTION

This invention relates to a speech channel or line switching network suitable for use in combination with an electronic key telephone set, and more particularly a speech channel switching network suitable for use in a key telephone system in which the speech channel is controlled directly by the supply of power from a telephone exchange of a telephone PBX or a telephone office.

Heretofore, in electronic apparatus having a simple exchanging capability such as an electronic key telephone set, PNPN transistor or diode switching elements or C-MOS transistor analogue electronic switching elements have been used as the speech channel switch.

Examples of the apparatus utilizing such electronic elements are shown in FIGS. 2 and 3, in which the former illustrates the construction of a prior art speech channel switching circuit utilizing such high loss electronic switching element as a C-MOS switching transistor, while the latter illustrates the construction of a prior art speech channel utilizing such electronic switching element as a PNPN transistor or diode switching element capable of ON.OFF controlling the speech currents.

To help easy understanding of the reason of using such circuit constructions, the construction of an earlier key telephone set not utilizing any electronic switching element will firstly be described with reference to FIG. 1 of the accompanying drawing which diagrammatically illustrates principal elements of the prior art key telephone set. As shown, it comprises a common control equipment or key service unit 1, input central central office lines 2a, a push button or key telephone set 3, a telephone set circuit 4, local lines 2b and central office line selection switches 5a, 5b, 5c and 5d. The input central office lines 2a to the common control equipment 1 and the telephone set circuit 4 are interconnected by central office line selection switches 5a through 5d via local lines 2b. For this reason, the DC resistance (loop resistance) of the common control equipment 1 as seen from the input central office lines 2a is equal to the sum of the resistance of a cable (that is the local lines 2b) between the common control equipment 1 and the key telephone set 3, and the internal resistance of the telephone circuit 4 (the total sum of the resistance of a transmitter, the resistance of a transformer winding, and an equivalent resistance caused by the voltage drop in a polarity reverse preventing circuit). In Japan, the loop resistance is prescribed by a regulation to be less than 220 ohms, because a maximum value of the line resistance to a telephone office is prescribed to be 1500 ohms, and even for a subscriber under such adverse condition, it is necessary for the telephone exchange in the telephone office to assure current (response current) necessary to drive a line relay provided for detecting whether or not the subscriber has hooked off its handset for talking.

For this reason, it has been impossible to use a terminal device (including a terminal device having a simple exchange capability) connected to a telephone line (a subscribers line) the internal DC resistance of which cannot be reduced to be less than 220 ohms. This is also true for the aforementioned electronic key telephone system utilizing electronic switching elements.

Usually, the internal resistance of the telephone set of a key type telephone set such as that disclosed, for example, in a paper entitled "Development of the Pushbutton Telephone Set", Electrical Communication Laboratories Technical Journal, Vol. 17, No. 11, page 2539, 1968, is equal to the sum of 90 ohms (the transmitter resistance plus the resistance of the transformer winding) and an equivalent resistance of 70 ohms caused by the voltage drop in a bridge rectifier provided for supplying current of a definite polarity to a circuit (MFO) which generates a key dial multi-frequency signal. More particularly, the voltage drop caused by two diodes selected from 4 diodes comprising a bridge rectifying circuit amounts to 1.4 V, and the current flowing through a line having a resistance of 1500 ohms is 20 mA so that equivalent resistance equals 1,4 V/0,02 A=70 ohms. When the loop resistance of 40 ohms is added to (90+70) ohms, the total resistance of the common control equipment 1 as seen from the input central office lines 2a becomes 200 ohms.

Thus, the key telephone set shown in FIG. 1, which does not utilize any electronic switching element, satisfies the regulation that the loop resistance should be less than 220 ohms.

However, when the central office line selection switches 5a through 5d are substituted by electronic switches, it becomes impossible to satisfy the regulation. For example, a C-MOS transistor switch has a resistance of about 100 Ω when it is in an ON or conductive state and even a modern one has a resistance of about 80 ohms so that it can not satisfy the regulation requiring less than 220 ohms. Generally, a C-MOS transistor can not be used in a speech channel switching circuit because its breakdown voltage is low, e.g. about 10 V, its current capacity is also small, e.g. about 20 mA and its ON resistance is high noted above. If it is necessary to use C-MOS transistors as the switching elements, the circuit should be constructed as shown in FIG. 2. In the circuit construction shown in FIG. 2, the central office line selection switches 5a through 5d are gathered in the common control equipment 1. In FIG. 2, the circuit elements corresponding to those shown in FIG. 1 are designated by the same reference characters, and numeral 6a designates a central office line transformer, 6b a local line transformer, 7a and 7b C-MOS transistor switching elements, and E a power source for supplying speech current to the key telephone set 3. With this construction, for the purpose of setting the internal resistance as seen from the input central office lines 2a to 220 ohms, a central office line transformer 6a is provided and the circuit is designed to satisfy the regulation by setting the resistance of the primary winding of this central office line transformer to be less than 220 ohms. Similary, for the purpose of decreasing the loss of the C-MOS transistor switches 7a and 7b an impedance transformation is effected by the secondary winding of the central office line transformer 6a to decrease the equivalent loss and then the impedance is transformed back to the original value by the secondary winding of the local line transformer 6b, thus matching the impedance with that of the key telephone set 3. Of course, the speech channel shown in FIG. 2 utilizing C-MOS transistors can be modified variously.

This circuit construction, however, has a serious defect that interruption of a commercial power source that drives the electronic key telephone set results in the interruption of the speech.

To prevent such defect, it is necessary to install a non-interruption power source, for example a back-up battery for the electronic key telephone set, but even when modern low power consumption circuit elements are used it is essential to continue supply of speech current to the key telephone set 3 from the back-up battery. Accordingly, in order to operate the telephone set with the battery over a long interval of from several hours to several tens of hours it is necessary to install a battery having a large capacity of the order of from 10 to several hundreds ampere hours, thus increasing cost and volume and making it difficult to maintain the battery always at the charged condition.

Where a PNPN transistor switching element is used having an ON resistance smaller by one order of magnitude than that of a C-MOS transistor, although it is not necessary to transform the impedance with transformers, where the input central office lines 2a are connected to local lines through PNPN transistor switching elements, since the voltage drop at the PN junctions is about 0.9 V, and the equivalent resistance is 45 ohms for a loop current of 20 mA, the sum of these resistances and the internal resistance of 200 ohms of the telephone circuit 4 shown in FIG. 1 exceeds the prescribed value of 220 ohms described above.

In this manner, the circuit construction shown in FIG. 2 can not be used for remotely located subscribers because of a large equivalent resistance caused by the voltage drop at the PN junctions. As a circuit, a circuit construction as shown in FIG. 3 has generally been used, in which elements coresponding to those shown in FIGS. 1 and 2 are designated by the same reference characters. In FIG. 3, PNPN transistor switching elements are designated by a reference numeral 9. The circuit construction shown in FIG. 3, however has the same defects as the circuit shown in FIG. 2 utilizing C-MOS switching transistors.

It has also been proposed to use, as the electronic switching elements, bidirectional switching elements at each one of four paired cross-points as disclosed in U.S. Pat. No. 4,060,699. This system also involves such problems that the relays of a telephone exchange in a telephone office do not operate for remotely located subscribers, that the line lengths of serviceable subscribers are limited and that switching elements having no self-holding action are used.

SUMMARY OF THE INVENTION

Accordingly, it is a principal object of this invention to provide an improved speech channel switching network suitable for use in combination with conventional electronic key telephone sets of existing telephone exchange systems.

Another object of this invention is to provide a novel speech channel switching network suitable to be combined with electronic key telephone sets, which can determine the length of the subscribers line in the same manner as the prior art system, and can maintain speech channels under an operating condition at the time of interruption of power supply without using any special measure.

Yet another object of this invention is to provide a novel speech channel switching network suitable to be combined with electronic key telephone sets capable of maintaining the polarity on the output side at a definite polarity irrespective of the polarity of the current supplied from a telephone office or a PBX telephone exchanger, thereby eliminating a bridge rectifier circuit for the key telephone sets.

A further object of this invention is to provide a speech channel switching network suitable to be combined with electronic key telephone sets and capable of simplifying the construction of the telephone circuit and hence of the entire telephone system, thus decreasing the cost of manufacturing.

According to this invention, these and further objects can be accomplished by providing a speech channel switching network adapted to be used in combination with an electronic key telephone set of a key telephone system including an electronic speech channel switching circuit, and an electronic key telephone set selectively connected to central office lines by the speech channel switching circuit, characterized in that the speech channel switching circuit comprises a pair of incoming lines connected to a pair of central office lines; a plurality of pairs of outgoing lines connected to a telephone set circuit of the electronic key telephone set, the incoming lines and the outgoing lines being arranged in a matrix; and controllable unidirectional switching elements each disposed at each one of four cross-points between the incoming and outgoing lines, each one of the switching elements being connected oppositely with respect to one incoming line and to one outgoing line which comprise a pair.

BRIEF DESCRIPTION OF THE DRAWINGS

In the accompanying drawings

FIG. 6 is a connection diagram showing a modified embodiment of this invention.

DESCRIPTION OF THE PREFERRED EMBODIMENTS

Figure 1:
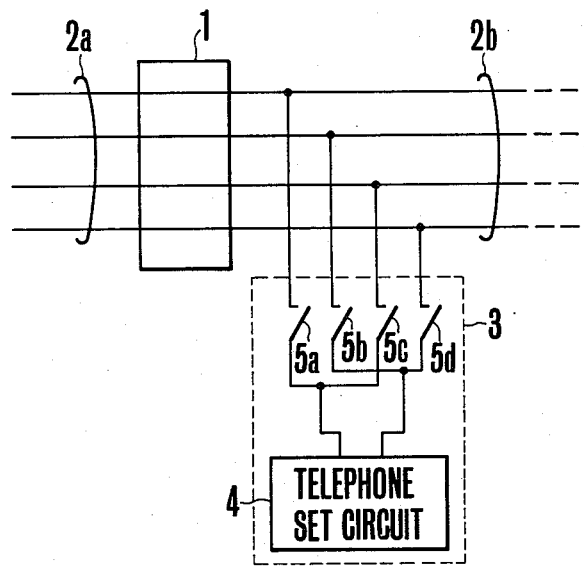
FIG. 1 is a block diagram showing essential elements of the speech channel of a prior art key telephone set.
Figure 2:
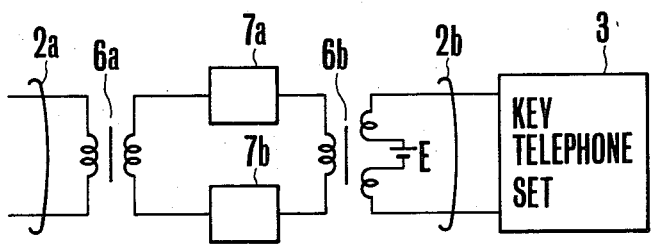
FIG. 2 is a connection diagram showing one example of a prior art speech channel switching circuit utilizing electronic switching elements having a large loss, for example C-MOS transistors.
Figure 3:
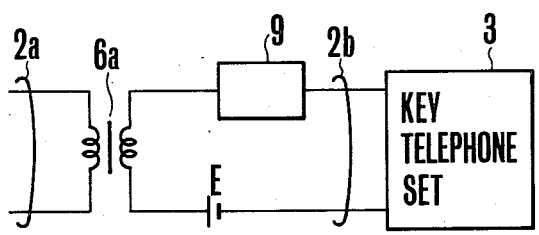
FIG. 3 is a connection diagram showing one example of a prior art speech channel switching circuit utilizing electronic switching element capable of ON.OFF control of the speech current, for example PNPN transistors.
Figure 4A:
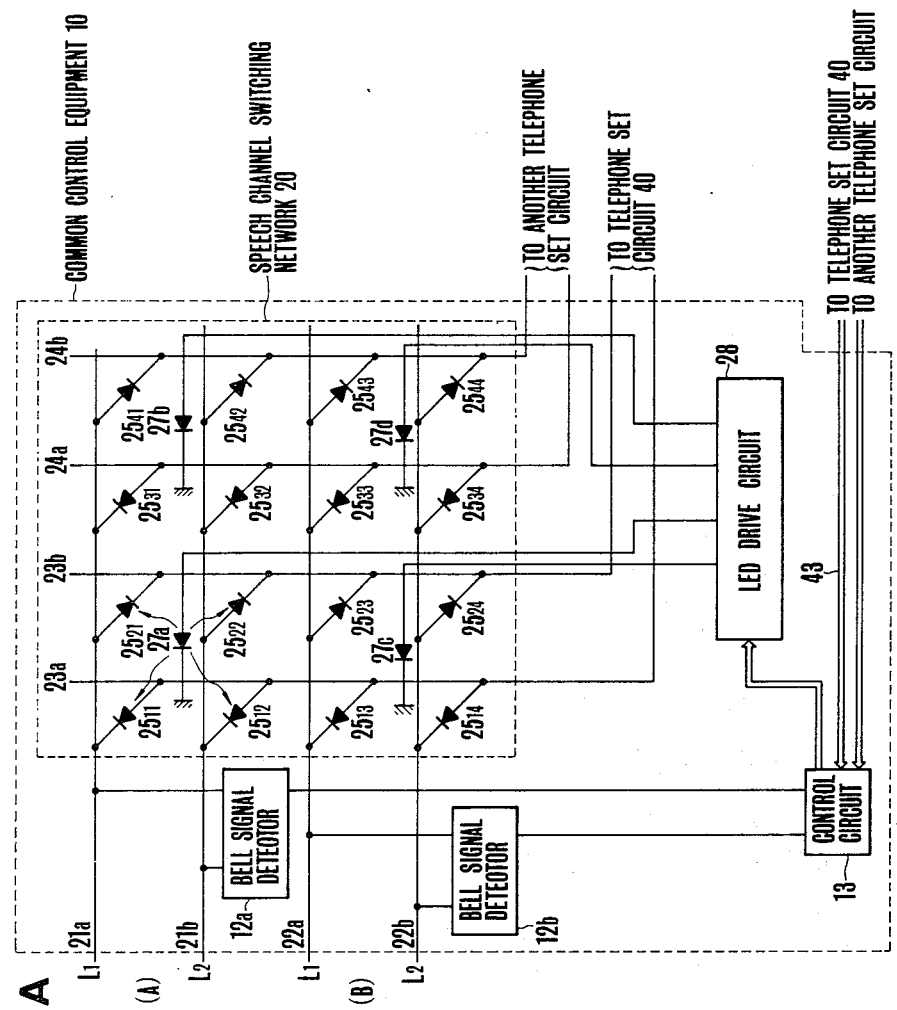
FIGS. 4A and 4B are connection diagrams showing one embodiment of the speech channel switching network of this invention which is suitable to be combined with an electronic telephone set.
Figure 4B:
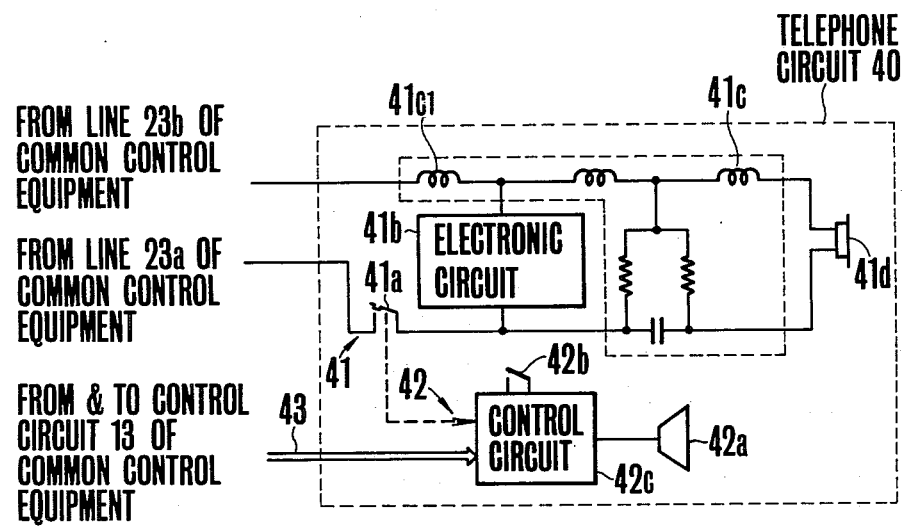

One embodiment of the speech channel switching network embodying the invention and shown in FIGS. 4A and 4B is adapted to be used in a key telephone system in which the common control equipment is provided with switching function. In FIG. 4A, input terminals L1 and L2 of the central office line, that is the input terminals of the common control equipment are respectively connected to bell signal detecting circuits 12a and 12b and the outputs thereof are sent to the control circuit 13 of the common control equipment 10. The control circuit 13 may be of a well known type, for example either of a wire logic control type or a stored program control type. The input terminals L1 and L2 are connected to a speech channel switching network 20 embodying the invention. In the switching network, lines $21a$, $21b$, $22a$ and $22b$ connected to the input terminals L1 and L2, and lines $23a$, $23b$, $24a$ and $24b$ connected to a key telephone circuit to be described hereinafter are arranged in a matrix, and unidirectional PNPN switching elements $25_{11}$–$25_{44}$ constituted by light controlled type PNPN switching elements are connected at the cross-points between the column lines and the row lines of the matrix circuit. Two lines $21a$ and $21b$ connected to the central office line and lines $23a$ and $23b$ connected to the telephone set form a set for performing a switching operation necessary to form a speech circuit loop. A switching element $25_{11}$ connected between lines $21a$ and $23a$ and a switching element $25_{12}$ connected between lines $21b$ and $23a$ are connected to pass current to the central office lines from the telephone set, whereas a switching element $25_{21}$ connected between lines $21a$ and $23b$ and a switching element $25_{22}$ connected between lines $21b$ and $23b$ are connected to pass current in the opposite direction from the central office lines towards the telephone set. In the speech channel switching network 20, each one of luminous diodes LED $27a$ through $27d$ is provided for each set of matrix lines for commonly controlling the switching elements of each set. For example, the luminous diode $27a$ is assigned to switching elements $25_{11}$, $25_{12}$, $25_{21}$ and $25_{22}$ so as to simultaneously control these four switching elements by the lighting and extinguishment of the luminous diode $27a$.

Figure 5:
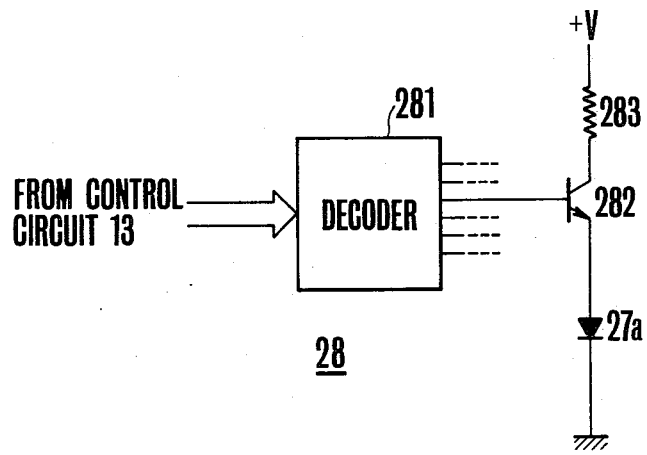
FIG. 5 is a connection diagram showing one example of the drive circuit shown in FIG. 4.

These luminous diodes $27a$–$27d$ are driven by a drive circuit 28 under the control of the control circuit 13. The drive circuit 28 may be of a well known type and one example of its construction is illustrated in FIG. 5.

More particularly, when a control signal for the speech channel switching network is sent from the control circuit 13, this signal is decoded by a decoder 281 and its decoded output is sent to one 282 of the driving transistors which drives the diode at a designated cross-point. The collector electrode of this transistor 282 is connected to a source V via a resistor 283, whereas the emitter electrode is connected to the anode electrode of one luminous diode $27a$, for example.

The key telephone set circuit 40 connected to the main circuit 10 is shown in FIG. 4B. This circuit 40 comprises an electronic speech circuit 41 and a control member 42 as its principal components. The speech channel 41 comprises a well known combination of a hook switch $41a$, key dial multifrequency signal generating circuit, a transmitter etc., an electronic circuit $41b$ which should be supplied with unidirectional voltage or current by using a semiconductor, a side tone preventing circuit $41c$ constituted by a resistor, a coil and a capacitor, and a receiver $41d$. The speech channel 41 shown in FIG. 4B is similar to that disclosed in the aforementioned reference except that a rectifier circuit is not included.

The control member 42 is constituted by a tone ringer calling loudspeaker $42a$, an central office line selection key $42b$ and a control circuit $42c$ for effecting a control operation in connection with the operation of a hook switch interlocked with key switches $41a$ and $42b$, the control circuit $42c$ driving the loudspeaker $42a$ in response to a signal from line 43. The control member 42 has the same construction as that disclosed in L. C. Allen et al "Explanatory Common Control Key System Novel Technological Aspects" 70-CP-253-COM, P. 11-9 11-14, International Conference on Communication, June, 1970, and is connected to the control circuit 13 of the common control equipment 10 over a line 43 which transmits control data and supplies power to the control circuit. Although, in FIG. 4 only one key $42b$ is shown, actually a plurality of such keys are provided.

The embodiment shown in FIGS. 4A and 4B operates as follows. When a bell signal of 16 Hz is supplied to A side line terminals L1 and L2 from a telephone exchange in a telephone office, the bell signal detection circuit $12a$ detects this bell signal and sends an information signal to the control circuit 13 of the common control equipment indicating that a call is being made. In response to this call information the common control equipment sends a ringer driving signal to all key telephone sets belonging to the common control equipment. For example, with regard to the key telephone set 40, this driving signal is sent to the control circuit 42 through line 43. As a consequence, the loudspeaker $42a$ is driven by this circuit $42c$ to inform that a call is incoming. As is well knowwn in the art, lamps may be lighted by the control circuit $42c$ for the purpose of discriminating a calling central office line where a plurality of central office lines are connected to the common control equipment.

When the user of the telephone set depresses the central office line selection key $42b$ and then hooks off the handset, hook switches including $41a$ are closed so as to cause the control circuit $42c$ to send an information signal showing that the user has responded to the control circuit 13 of the common control equipment.

The control circuit 13 of the common control equipment 10 sends a switch selection signal to the drive circuit 28 of the switching elements in accordance with the information described above. The selection signal is decoded by decoder 281 shown in FIG. 5 and contained in the drive circuit 28 to drive a selected transistor 282 for driving the luminous diode $27a$. The light emitted by the luminous diode irradiates the junctions of the switching elements $25_{11}$, $25_{12}$ $25_{21}$ and $25_{22}$. At this time, since hook switch $41a$ of the telephone set circuit 40 is closed, driving of the luminous diode $27a$ establishes a current loop between the telephone set circuit 40 and the telephone office. More particularly, among the switching elements irradiated by the light emitted by the luminous diode $27a$ those biased forwardly alone become conductive. Thus, when a positive voltage is impressed upon the central office line input terminal L1 and when a negative voltage is impressed upon the input terminal L2, among the switching elements constituting the cross-point sets, only the switching elements $25_{21}$ and $25_{12}$ are biased forwardly and the other switching elements $25_{11}$ and $25_{22}$ are biased reversely. Consequently, the current from the telephone exchange flows through the following path:

Input terminal L1(+)-line $21a$-switching element $25_{21}$-line $23b$-speech channel 41 (a portion of the circuit $41c$-$41b$-$41a$)-line $23a$-switching element $25_{12}$-input terminal L2(−).

Conversely, when a positive voltage is impressed upon the central office line input terminal L2 and when a negative voltage is impressed upon the input terminal L2, switching elements $25_{11}$ and $25_{22}$ are biased forwardly, whereas the switching elements $25_{21}$ and $25_{12}$ are biased reversely with the result that the current from the telephone exchange would flow through the following path.

Input terminal L2(+)-line $21b$-switching element $25_{22}$-line $23b$-speech channel 41 (a portion of the circuit 41c-41b-41a)-line 23a-switching element $25_{11}$-input terminal L1(−).

In this manner, according to this invention, irrespective of the polarity of the voltage applied to the central office line input terminals L1 and L2, it is possible to pass current through the telephone set circuit always in a definite direction. As a consequence, current in the definite direction also flows through the electric circuit 41b of the telephone set circuit 40. Thus, it is possible to always supply voltage or current of a correct polarity to a circuit which generates multi-frequency signal for the keys, and to other circuits requiring voltage or current of a definite direction, which are contained in the electronic circuit 41b. This means that when a called party responds, the polarity of office source reverses and hence that of the voltage appearing at the central office line input terminals L1 and L2 also reverses, but current flows through the telephone set circuit always in the definite direction.

In other words, according to this invention it is possible to ensure a definite polarity on the output side of the speech channel switching circuit regardless of the polarity of the voltage sent from a telephone exchange in a telephone office or a PBX. This eliminates a diode bridge rectifier circuit which always has been incorporated into a prior art electronic key telephone set.

Considering the construction of the speech channel described above from the standpoint of a DC resistance, since the equivalent resistance at a current of 20 mA flowing through each PNPN switching element is 45 ohms as above pointed out and since two elements are rendered conductive at each crosspoint of the matrix circuit, a total of 90 ohms appears. Consequently, a total sum of this resistance, the resistance of 90 ohms of the speech channel 41, more particularly the sum of the resistance of the circuit 41b (transmitter) and the resistance of a portion (winding 41c) of the side tone preventing circuit 41c, and a maximum permissible resistance value of 40 ohms of the local lines betwen the common control equipment 10 and the telephone set circuit 40 amounts to 220 ohms which is within the prescribed value determined by the regulation. Thus, the speech channel switching network is applicable to existing telephone exchange systems to ensure satisfactory service to remotely located subscribers.

A condition in which a commercial power supply is interrupted during speech will now be described.

As above described, with the prior art speech channel construction utilizing electronic switching elements it has been necessary to install a large capacity back-up battery to ensure speech during the interruption of the commercial power supply, whereas according to this invention, as the PNPN switching elements of the speech channel switching circuit 20 are driven directly from the source of the telephone exchange in the office so that as long as voltage is impressed across the anode and cathode electrodes of the PNPN switching elements they self hold their ON states once they have been rendered ON even when luminous diodes 27a through 27d become inoperative with the result that the switching elements would not be turned OFF. For the reason described above, the speech channel to the telephone set circuit 40 from the office exchange via the common control equipment 10 can be maintained to enable continued talking even when the common control equipment 10, the control circuit 13 and 42c of the telephone set circuit 40, and the drive circuit 28 of the PNPN switching elements become inoperative due to interruption of power supply. As above described, the same operation as the normal operation is thus provided without interruption of speech during a fault of the power source and without providing any spare power source such a battery.

When the party terminates its speech and hooks-on its handset, the hook switch 41a would be opened to interrupt the DC loop circuit described above, thus stopping current flowing through the switching elements of the speech channel switching network 20. Accordingly, due to the characteristics of the PNPN switching elements the PNPN switching elements $25_{21}$, $25_{12}$ or $25_{11}$, $25_{22}$ which have been conductive until that time become non-condutive (OFF). As the switching function of the speech channel is restored, a line relay (not shown) of the office telephone exchange is opened whereby the telephone system attains a speech termination state.

The prior art circuits utilizing PNPN switching elements or C-MOS type switching transistors require coupling transformers so that a loss of about 0.5 dB in the voice frequency band caused by the transformers is inevitable, thus degrading the quality of the speech. To decrease such loss, it is necessary to use a large transformer, thus increasing size of the common control equipment which is uneconomical.

According to this invention, however, since a transformer which causes the major portion of the loss of the speech channel can be eliminated, the loss of the channel comprises only the loss (less than about 0.05 dB) caused by the AC resistance of the PNPN switching elements and such a small loss can be neglected.

Although in the foregoing emebodiment a light coupling type speech channel switching network has been described wherein the PN junctions of the PNPN switching elements are irradiated with light emitted by luminous elements for the purpose of turning on these switching elements, it will be clear that the invention is not limited to such specific construction. For example, ordinary gate type PNPN transistor switching elements having gate electrodes can also be used to attain the same object.

FIG. 6 shows a modified embodiment of the speech channel switching network which utilizes gate type PNPN switching elements, in which circuit elements corresponding to those shown in FIG. 4A are designated by the same reference characters. Thus, the PNPN switching elements $25'_{11}$-$25'_{44}$ disposed at respective cross-points of the speech channel switching network 20' are of the gate control type. Respective gate terminals are connected to the cathode electrodes of gate type PNPN switching elements $25'_{11}$ through $25'_{44}$ respectively through bias resistors $51_{11}$ through $51_{44}$. Further, these gate terminals are connected to the cathode electrodes of diodes $52_{11}$ through $52_{44}$, the anode electrodes thereof being connected to the drive circuit 28. These diodes are connected such that the mutual effect between the speech channel system and the control system is decreased and that only the drive pulse is applied to the gate terminals of the switching elements $25'_{11}$ through $25'_{44}$. Considering switching elements which comprise sets, for example elements $25'_{11}$ and $25'_{12}$ and the elements $25'_{21}$ and $25'_{22}$, PNPN switch elements $25'_{11}$ and $25'_{12}$ whose cathode electrodes are connected to the central office lines, and the PNPN switching elements $25'_{21}$ and $25'_{22}$ whose anode electrodes are connected to the central office lines, are connected to be driven by the drive circuit 28 as independent sets. More particularly, the anode electrodes of diodes $52_{11}$ and $52_{12}$ are commonly connected, and the anode electrodes of diodes $52_{21}$ and $52_{22}$ are also commonly connected, each set of commonly connected anode electrodes being connected to a different output terminal of the drive circuit 28. Other constructions are the same those shown in FIGS. 4A and 4B.

The modification shown in FIG. 6 operates as follows: In the same manner as in the previous embodiment, when a speech channel switching element is supplied to the drive circuit 28, drive signals would appear on the output terminals a and b of the drive circuit 28 where it is desired to interconnect the A side central office line terminals L1 and L2 and the telephone set circuit 40. These output signals are applied to the gate electrodes of switching elements $25'_{11}$ and $25'_{12}$ and of the switching elements $25'_{21}$ and $25'_{22}$ respectively through diode pairs $52_{11}$ and $52_{12}$, and $52_{21}$ and $52_{22}$. As a consequence, depending upon the polarity of the voltage applied to the central office line terminals L1 and L2 either one of the switching element pairs $25'_{11}$ and $25'_{22}$, and $25'_{21}$ and $25'_{12}$ is biased forwardly, whereas the other pairs are biased reversely to be maintained in their OFF state. The other operation is identical to that already described in connection with the previous embodiment.

What is claimed is:

1. In a speech channel switching network adapted to be used in combination with an electronic key telephone set of a key telephone system including an electronic speech channel switching circuit, and an electronic key telephone set adapted to be selectively connected to central office lines by said speech channel switching circuit, the improvement wherein said speech channel switching circuit comprises first and second incoming lines for connection to a pair of central office lines; first and second outgoing lines connected to a telephone set circuit of said electronic key telephone set, said incoming lines and said outgoing lines being arranged in a matrix; and four controllable unidirectional switching elements each disposed at a different one of four crosspoints between said incoming and outgoing lines, a first one of said unidirectional switching elements being connected between said first incoming line and said first outgoing line with a first polarity, a second one of said unidirectional switching elements being connected between said first incoming line and said second outgoing line with a polarity opposite that of said first polarity, a third one of said unidirectional switching elements being connected between said second incoming line and said first outgoing line with said first polarity, and a fourth one of said unidirectional switching elements being connected between said second incoming line and said second outgoing line with a polarity opposite that of said first polarity, so that the polarity of current flowing along said outgoing lines is unaffected by the relative polarity of signals on said incoming lines.

2. The speech channel switching network according to claim 1 wherein each one of said switching elements is of the light controlled type.

3. The speech channel switching network according to claim 1 wherein each one of said switching elements is of the gate controlled type.

* * * * *

UNITED STATES PATENT AND TRADEMARK OFFICE
CERTIFICATE OF CORRECTION

PATENT NO. : 4,292,476

DATED : September 29, 1981

INVENTOR(S) : Kazuyuki Yamamoto et al.

It is certified that error appears in the above—identified patent and that said Letters Patent is hereby corrected as shown below:

Column 5, line 58, "an" should read -- a --.

Column 8, line 5 "such a battery" should read
-- as a battery --.

Column 6, line 19, "knowwn" should read -- known --.

Column 8, line 32, "emembodiment" should read -- embodiment --.

Signed and Sealed this

Second Day of February 1982

[SEAL]

Attest:

GERALD J. MOSSINGHOFF

Attesting Officer     Commissioner of Patents and Trademarks